United States Patent [19]

Masuyama et al.

[11] Patent Number: 4,547,314
[45] Date of Patent: Oct. 15, 1985

[54] SEMICONDUCTIVE CERAMIC MATERIALS WITH A VOLTAGE-DEPENDENT NONLINEAR RESISTANCE

[75] Inventors: Masaru Masuyama, Harunamachi; Susumu Hirooka, Takasaki; Nobutatsu Yamaoka, Harunamachi, all of Japan

[73] Assignee: Taiyo Yuden Co., Ltd., Tokyo, Japan

[21] Appl. No.: 507,550

[22] Filed: Jun. 24, 1983

[30] Foreign Application Priority Data

Aug. 24, 1982 [JP] Japan ................. 57-146343

[51] Int. Cl.⁴ ............................................. H01B 1/06
[52] U.S. Cl. ........................... 252/520; 252/521; 501/136
[58] Field of Search .......... 252/518, 520, 521, 62.3 R, 252/62.3 V, 62.3 BT; 338/20, 21; 501/134, 135, 136, 152, 153, 154, 138, 139

[56] References Cited

U.S. PATENT DOCUMENTS

| | | | |
|---|---|---|---|
| 3,704,266 | 11/1972 | Ueoka et al. | 252/520 X |
| 3,859,403 | 1/1975 | Kahin | 252/62.3 BT |
| 4,055,438 | 10/1977 | Wada et al. | 252/520 |
| 4,143,207 | 3/1979 | Itukura et al. | 252/520 |
| 4,191,665 | 3/1980 | Mandai | 252/520 |
| 4,222,783 | 9/1980 | Atsumi et al. | 252/520 |
| 4,319,215 | 3/1982 | Yamazaki et al. | 252/521 |
| 4,337,162 | 6/1982 | Payne et al. | 252/62.3 BT |
| 4,362,637 | 12/1982 | Matsuo et al. | 252/521 X |
| 4,384,989 | 5/1983 | Kamigaito et al. | 252/62.3 BT |
| 4,386,022 | 5/1983 | Nagasawa et al. | 252/521 |

FOREIGN PATENT DOCUMENTS 70540 1/1983 European Pat. Off. .

*Primary Examiner*—Josephine L. Barr
*Attorney, Agent, or Firm*—Woodcock, Washburn, Kurtz, Mackiewicz & Norris

[57] ABSTRACT

Ceramic materials suitable for use in varistors, enabling the same to function not only as such but also as capacitors. The ceramic materials comprise a major proportion of $SrTiO_3$, the balance being: (1) at least one of $Nb_2O_5$, $Ta_2O_5$, $WO_3$, $La_2O_3$, $CeO_2$, $Nd_2O_3$, $Y_2O_3$, $Pr_6O_{11}$, $Sm_2O_3$, $Eu_2O_3$, and $Dy_2O_3$, for making the materials semiconductive; (2) $Na_2O$, for making surge-proof the varistors made from the ceramic materials and for improving their nonlinearity coefficients; and (3) $Al_2O_3$, for improving the temperature dependences of the varistor voltages, as well as nonlinearity coefficients, of the varistors. Optionally the ceramic materials may further contain one or more of $Ag_2O$, $CuO$, $MnO_2$, and $SiO_2$, for still higher nonlinearity coefficients. Containing $Al_2O_3$ in proportions ranging from 0.01 to 1.50 mole parts with respect to 100 mole parts of $SrTiO_3$, the ceramic compositions make possible the provision of varistors having varistor voltages that hardly change in a temperature range as wide as, for example, from $-40°$ to $+120°$ C.

2 Claims, 3 Drawing Figures

SEMICONDUCTIVE CERAMIC MATERIALS WITH A VOLTAGE-DEPENDENT NONLINEAR RESISTANCE

BACKGROUND OF THE INVENTION

Our present invention relates to ceramic materials in general and, in particular, to semiconductive ceramic materials composed principally of strontium titanate, $SrTiO_3$, and having a voltage-dependent nonlinear resistance. The ceramic materials according to our invention find a typical application in varistors known also as voltage-dependent resistors.

Parallel connections of varistors and capacitors have been used extensively for the absorption or suppression of abnormal voltages in electronic circuits. It is obvious, then, that devices possessing both varistor and capacitor functions can attain the same purpose with simpler circuit configurations. Our European Patent Publication No. 44,981, dated Feb. 3, 1982, describes and claims semiconductive ceramic compositions in a perovskite structure consisting primarily of $SrTiO_3$, suitable for use in varistors capable of such a dual function. The dual-purpose ceramic varistors according to this prior art can favorably suppress abnormal voltages without the aid of capacitors.

The conventional $SrTiO_3$ ceramic varistors, however, proved to be susceptible to voltage or current surges. In order to make them surge-proof and hence to widen their field of applications we have proposed improved $SrTiO_3$ ceramics in our European Patent Application No. 82,106,421.9 filed July 16, 1982, now Patent Publication No. 70,540 dated Jan. 26, 1983. The improved $SrTiO_3$ ceramics contain sodium monoxide, $Na_2O$, as a surgeproofing agent. The varistors made from the $SrTiO_3$-$Na_2O$ ceramics can well withstand voltage and current surges, besides being capable of functioning not only as such but also as capacitors.

Although satisfactory for most practical purposes, the known $SrTiO_3$-$Na_2O$ ceramic varistors have still proved to have one weakness in a limited field of applications. It is the temperature dependence of the varistor voltage (i.e., in the volt-ampere curve of the varistor, the voltage at which the current starts rising in magnitude). Varistors whose varistor voltages change less in a wider range of temperatures will find their way into electronic circuits of motor vehicles or the like, where they are expected to function properly in a temperature range as wide as from $-40°$ to $+120°$ C.

SUMMARY OF THE INVENTION

In view of the foregoing state of the art we seek to provide more improved semiconductive ceramic materials having a voltage-dependent nonlinear resistance, for the provision of dual-purpose varistors whose varistor voltages change less in a wider range of temperatures than heretofore. The varistors fabricated by use of the improved ceramic materials of our invention are further notable for their surge-proofness, being little affected by surges in their varistor voltages, nonlinearity coefficients, and temperature dependences of the varistor voltages.

Basically we contemplate the provision of semiconductive ceramic materials consisting essentially of 100 mole parts of $SrTiO_3$, from about 0.01 to about 3.00 mole parts of at least one metal oxide selected from the class consisting of niobium oxide, $Nb_2O_5$, tantalum oxide (tantalic acid anhydride), $Ta_2O_5$, tungstic oxide (tungstic acid anhydride), $WO_3$, lanthanum oxide (lanthana), $La_2O_3$, ceric oxide (cerium dioxide), $CeO_2$, neodymium oxide (neodymia), $Nd_2O_3$, yttrium oxide (yttria), $Y_2O_3$, samarium oxide, $Sm_2O_3$, praseodymium oxide (praseodymia), $Pr_6O_{11}$, europium oxide (europia), $Eu_2O_3$, and dysprosium oxide (dysprosia), $Dy_2O_3$, from about 0.02 to about 2.50 mole parts of $Na_2O$, and from about 0.01 to about 1.50 mole parts of aluminum oxide (alumina), $Al_2O_3$.

$SrTiO_3$, the first ingredient, is the principal constituent of the ceramic materials. The second ingredient or group of ingredients, one or more of the listed metal oxides, serve chiefly to make the materials semiconductive. The third ingredient, $Na_2O$, functions to make surge-proof the varistors made from the ceramic materials and to improve their nonlinearity coefficients. It is the fourth ingredient, $Al_2O_3$, that is effective to improve the temperature dependencies of the varistor voltages of the varistors made from the ceramic materials. We have ascertained by experiment that the fourth ingredient serves also to improve the nonlinearity coefficients of the varistors. All in all, the varistors of the above improved ceramic compositions in accordance with our invention have their varistor voltages little affected by temperature changes. Further the application of surges to the varistors hardly deteriorates their properties such as varistor voltages, nonlinearity coefficients, and temperature dependences of the varistor voltages.

According to a further feature of our invention the ceramic materials additionally comprise from about 0.01 to about 3.00 mole parts of at least one oxide (fifth ingredient) selected from the group consisting of silver oxide, $Ag_2O$, black copper oxide, $CuO$, manganese dioxide, $MnO_2$, and silica, $SiO_2$.

The addition of the fifth ingredient or set of ingredients to the above compositions materially improves the non-linearity coefficients of the varistors formulated from the ceramic materials, among other electrical properties. The other properties of these varistors are, moreover, just as favorable as those of the varistors not containing the fifth ingredient or set of ingredients.

It is to be noted that the claimed compositions are those of the completed ceramic materials, not of those before firing or baking. Thus, instead of $Na_2O$, the third ingredient, any such sodium compound as sodium fluoride, $NaF$, may be used as a starting substance, either singly or in combination with $Na_2O$. All that is required is that the completed ceramic materials contain $Na_2O$.

The above and other features and advantages of our invention will become more apparent, and the invention itself will best be understood, from a study of the following description and appended claims, with reference had to the attached drawings.

DETAILED DESCRIPTION

Figure 1:
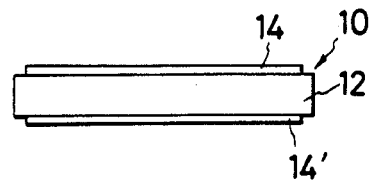
FIG. 1 is a side elevation of one of many similar test varistors fabricated by use of the improved ceramic materials of various possible compositions in accordance with our invention in order to measure and evaluate their properties.

We will now describe our invention in terms of Examples dealing with specific ceramic materials as actually produced and with the properties of varistors made from the ceramic materials. Most of the Examples conform to the principles of our invention whereas the others do not. We give such noninventive Examples here because we believe that they, combined with inventive Examples, serve to substantiate the claimed proportions of the ingredients.

In all these Examples, both inventive and noninventive, parts and ratios are molar unless otherwise specified.

EXAMPLES 1-64

We prepared $SrTiO_3$, the first or principal ingredient of the ceramic materials in accordance with the invention, through the following procedure. Strontium carbonate, $SrCO_3$, and titanium dioxide, $TiO_2$, with a purity of 99.8 percent, were mixed in a ratio required to provide $SrTiO_3$. The mixture was bowl-milled for 10 hours, dried, then crushed. The crushed $SrCO_3$-$TiO_2$ mixture was fired at a temperature of 1200° C. for two hours and then crushed again. Thus was obtained the desired $SrTiO_3$ in finely divided form.

Sixty-four different ceramic compositions were formulated by admixing the above prepared $SrTiO_3$ powder with:

1. One or more metal oxides (second ingredient or group of ingredients) chosen from among $Nb_2O_5$, $Ta_2O_5$, $WO_3$, $La_2O_3$, $CeO_2$, $Nd_2O_3$, $Pr_6O_{11}$, $Y_2O_3$, $Sm_2O_3$, $Eu_2O_3$, and $Dy_2O_3$, all in finely divided form and with a purity of 99.0 percent.
2. Either or both of $Na_2O$ and $NaF$ (third ingredient or group of ingredients) both in finely divided form and with a purity of 97.0 percent or more.
3. $Al_2O_3$ (fourth ingredient) in finely divided form and with a purity of 99.0 percent or more.

Table 1 lists the specifid ingredients of the sixty-four ceramic compositions, making up Examples 1 through 64, and their proportions. We omitted the first ingredient, $SrTiO_3$, from Table 1 and other similar tables given subsequently, because its proportion is fixed at 100 parts in all the Examples.

TABLE 1

Ceramic Compositions
(Aside from 100 parts of $SrTiO_3$, the first ingredient)

| Example | Second ingredient(s) in use and proportion(s), part | Starting third ingredient(s) in use and proportion(s), part | Fourth ingredient, $Al_2O_3$, part | Postfiring third ingredient, $Na_2O$, part |
|---|---|---|---|---|
| 1 | $Nb_2O_5$, 0.10 | $Na_2O$, 1.00 | 0.01 | 1.00 |
| 2 | $Nb_2O_5$, 0.10 | $Na_2O$, 1.00 | 0.10 | 1.00 |
| 3 | $Nb_2O_5$, 0.10 | $Na_2O$, 1.00 | 0.50 | 1.00 |
| 4 | $Nb_2O_5$, 0.10 | $Na_2O$, 1.00 | 1.00 | 1.00 |
| 5 | $Nb_2O_5$, 0.10 | $Na_2O$, 1.00 | 1.50 | 1.00 |
| 6 | $Nb_2O_5$, 0.10 | $Na_2O$, 1.00 | 0.00 | 1.00 |
| 7 | $La_2O_3$, 1.00 | NaF, 0.04 | 0.01 | 0.02 |
| 8 | $La_2O_3$, 1.00 | NaF, 0.04 | 0.10 | 0.02 |
| 9 | $La_2O_3$, 1.00 | NaF, 0.04 | 0.50 | 0.02 |
| 10 | $La_2O_3$, 1.00 | NaF, 0.04 | 1.00 | 0.02 |
| 11 | $La_2O_3$, 1.00 | NaF, 0.04 | 1.50 | 0.02 |
| 12 | $La_2O_3$, 1.00 | NaF, 0.04 | 0.00 | 0.02 |
| 13 | $Pr_6O_{11}$, 3.00 | NaF, 3.00 | 0.01 | 1.50 |
| 14 | $Pr_6O_{11}$, 3.00 | NaF, 3.00 | 0.10 | 1.50 |
| 15 | $Pr_6O_{11}$, 3.00 | NaF, 3.00 | 0.50 | 1.50 |
| 16 | $Pr_6O_{11}$, 3.00 | NaF, 3.00 | 1.00 | 1.50 |
| 17 | $Pr_6O_{11}$, 3.00 | NaF, 3.00 | 1.50 | 1.50 |
| 18 | $Pr_6O_{11}$, 3.00 | NaF, 3.00 | 0.00 | 1.50 |
| 19 | $WO_3$, 0.01 | $Na_2O$, 0.50 | 0.50 | 0.50 |
| 20 | $WO_3$, 0.10 | $Na_2O$, 0.50 | 0.50 | 0.50 |
| 21 | $WO_3$, 0.50 | $Na_2O$, 0.50 | 0.50 | 0.50 |
| 22 | $WO_3$, 1.00 | $Na_2O$, 0.50 | 0.50 | 0.50 |
| 23 | $WO_3$, 2.00 | $Na_2O$, 0.50 | 0.50 | 0.50 |
| 24 | $WO_3$, 3.00 | $Na_2O$, 0.50 | 0.50 | 0.50 |
| 25 | $WO_3$, 3.50 | $Na_2O$, 0.50 | 0.50 | 0.50 |
| 26 | $CeO_2$, 0.50 | $Na_2O$, 0.02 | 1.50 | 0.02 |
| 27 | $CeO_2$, 0.50 | $Na_2O$, 0.10 | 1.50 | 0.10 |
| 28 | $CeO_2$, 0.50 | $Na_2O$, 0.50 | 1.50 | 0.50 |
| 29 | $CeO_2$, 0.50 | $Na_2O$, 1.00 | 1.50 | 1.00 |
| 30 | $CeO_2$, 0.50 | $Na_2O$, 2.50 | 1.50 | 2.50 |
| 31 | $CeO_2$, 0.50 | $Na_2O$, 0.01 | 1.50 | 0.01 |
| 32 | $CeO_2$, 0.50 | $Na_2O$, 3.00 | 1.50 | 3.00 |
| 33 | $Ta_2O_5$, 0.01 | NaF, 0.04 | 1.50 | 0.02 |
| 34 | $Ta_2O_5$, 1.00 | NaF, 5.00 | 1.00 | 2.50 |
| 35 | $Ta_2O_5$, 3.00 | NaF, 2.00 | 0.10 | 1.00 |
| 36 | $Nd_2O_3$, 0.005 | NaF, 1.00 | 1.50 | 0.50 |
| 37 | $Nd_2O_3$, 0.50 | NaF, 0.20 | 1.50 | 0.10 |
| 38 | $Nd_2O_3$, 1.00 | NaF, 0.04 | 1.50 | 0.02 |
| 39 | $Eu_2O_3$, 0.01 | $Na_2O$, 2.50 | 0.01 | 2.50 |
| 40 | $Eu_2O_3$, 1.00 | $Na_2O$, 0.02 | 0.50 | 0.20 |
| 41 | $Eu_2O_3$, 3.00 | $Na_2O$, 2.50 | 1.00 | 2.50 |
| 42 | $Sm_2O_3$, 0.10 | $Na_2O$, 0.10 | 0.01 | 0.10 |
| 43 | $Sm_2O_3$, 0.50 | $Na_2O$, 1.00 | 0.50 | 1.00 |
| 44 | $Sm_2O_3$, 1.00 | $Na_2O$, 2.00 | 1.00 | 2.00 |
| 45 | $Y_2O_3$, 0.10 | NaF, 5.00 | 1.50 | 2.50 |
| 46 | $Y_2O_3$, 0.50 | NaF, 1.00 | 0.50 | 0.50 |
| 47 | $Y_2O_3$, 3.50 | NaF, 0.04 | 0.01 | 0.02 |
| 48 | $Dy_2O_3$, 0.01 | $Na_2O$, 0.02 | 1.50 | 0.02 |
| 49 | $Dy_2O_3$, 1.00 | $Na_2O$, 1.00 | 1.00 | 1.00 |
| 50 | $Dy_2O_3$, 3.00 | $Na_2O$, 0.20 | 0.01 | 0.02 |
| 51 | $Nb_2O_5$, 0.50 $Ta_2O_5$, 0.50 | $Na_2O$, 0.20 | 0.01 | 0.02 |
| 52 | $La_2O_3$, 0.005 $Nb_2O_5$, 0.005 | $Na_2O$, 0.10 | 0.01 | 0.10 |
| 53 | $Eu_2O_3$, 1.50 $Sm_2O_3$, 1.50 | NaF, 0.04 | 0.10 | 0.02 |
| 54 | $WO_3$, 0.20 $Ta_2O_5$, 0.30 | NaF, 1.00 | 0.10 | 0.50 |
| 55 | $La_2O_3$, 1.00 $CeO_2$, 2.00 | $Na_2O$, 0.50 | 0.50 | 0.50 |
| 56 | $Y_2O_3$, 0.10 $Sm_2O_3$, 0.10 | $Na_2O$, 2.50 | 0.50 | 2.50 |
| 57 | $Nd_2O_3$, 1.00 $Eu_2O_3$, 2.00 | NaF, 2.00 $Na_2O$, 0.50 | 1.00 | 1.50 |
| 58 | $Ta_2O_5$, 2.00 $CeO_2$, 1.00 | NaF, 1.00 $Na_2O$, 1.00 | 1.00 | 1.50 |
| 59 | $WO_3$, 0.005 $La_2O_3$, 0.005 | $Na_2O$, 0.02 | 1.50 | 0.02 |
| 60 | $Nb_2O_5$, 1.00 $Ta_2O_3$, 2.00 | NaF, 5.00 | 1.50 | 2.50 |
| 61 | $Nb_2O_5$, 0.50 $Ta_2O_5$, 0.50 $WO_3$, 1.00 | NaF, 1.00 | 0.01 | 0.50 |
| 62 | $La_2O_3$, 2.00 $CeO_2$, 0.50 $Nd_2O_3$, 0.50 | $Na_2O$, 0.10 | 0.01 | 0.10 |
| 63 | $Y_2O_3$, 1.00 $Pr_6O_{11}$, 1.00 $Sm_2O_3$, 1.00 | $Na_2O$, 0.02 | 0.10 | 0.02 |
| 64 | $WO_3$, 0.50 $Nd_2O_3$, 0.30 $Eu_2O_3$, 0.20 | $Na_2O$, 0.30 NaF, 0.40 | 1.50 | 0.50 |

Charged into a mortar, each mixture was stirred dry for 20 hours. Then, in order to process the mixtures into ceramic test discs, approximately 10 to 15 percent by weight polyvinyl alcohol was added and blended in to serve as a temporary binder. The mixtures were subsequently molded into discs by pressing at approximately 1500 kilograms per square centimeter ($kg/cm^2$). The discs were fired at approximately 1350° C., for four hours, in a reductive atmosphere consisting of 95 percent by capacity molecular nitrogen, $N_2$, and five percent by capacity molecular hydrogen, $H_2$.

Each semiconductive ceramic test disc thus fabricated had a diameter of 10.0 millimeters (mm) and a thickness of 0.8 mm. The discs were further put to oxidative heat treatment, in air, in the temperature range from 1000° to 1200° C., for three hours. The heating of the discs converted their NaF content into $Na_2O$. The other ingredients remained unchanged. Table 1 gives, therefore, the proportions of only the $Na_2O$ (third ingredient) contents of the discs after their firing.

We processed the thus prepared ceramic test discs into test varistors by electroding the discs with a commercial silver electroding composition. FIG. 1 shows one such test varistor, generally indentified by the reference numeral 10. The representative test varistor 10 has a ceramic disc 12, fabricated as in the foregoing, bearing a pair of electrodes 14 and 14' on its opposite faces. These electrodes were formed by coating the opposite disc faces with the commercial silver paste and by firing the coatings at 800° C.

We proceeded to evaluate various electrical properties of the above completed test varistors, mostly having their ceramic bodies composed in accordance with the teachings of our invention. The properties tested were:
1. Varistor voltage ($V_1$).
2. Nonlinearity coefficient ($\alpha$).
3. The temperature dependence ($\Delta V_1$) of the varistor voltage ($V_1$).
4. Capacitance (C).
5. The percent variations ($\Delta V_{1P}$ and $\Delta \alpha_P$) of the varistor voltage ($V_1$) and nonlinearity coefficient ($\alpha$) after application of voltage surges to the test varistors.
6. The temperature dependence ($\Delta V_{1T}$) of the varistor voltage ($V_1$) after application of voltage surges to the test varistors.

Table 2 represents the results.

We will explain in the following paragraphs the methods adopted to the mesurement of the above enumerated properties of the test varistors.

Figure 2:
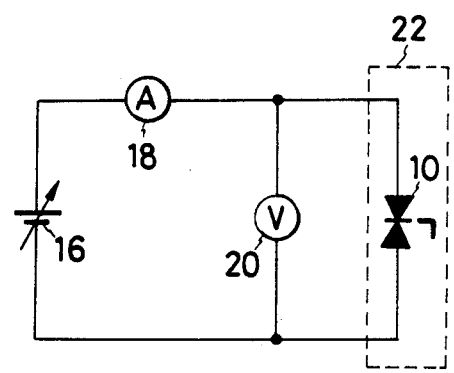
FIG. 2 is a schematic electrical diagram of a circuit for use in testing some electrical properties of the test varistors.

For the measurement of varistor voltages ($V_1$) we used the circuit of FIG. 2. It will be seen from this figure that each test varistor 10 being tested is connected in circuit with a constant current source 16. The circuit further comprises an ammeter 18 connected between current source 16 and test varistor 10, and a voltmeter 20 connected in parallel with the test varistor. The test varistor was placed within a closed vessel depicted by the dashed outline referenced 22, in which the temperature was thermostatically maintained at 20° C. An electric current ($I_1$) of one milliampere was made to flow from current source 16 to test varistor 10, and the reading of the voltmeter 20 at that time was taken as the varistor voltage ($V_1$) of the test varistor.

We also used the FIG. 2 circuit for the determination of nonlinearity coefficients ($\alpha$). As for the measurement of varistor voltages a current ($I_{10}$) of 10 milliamperes was made to flow from current source 16 to each test varistor 10, and the voltage ($V_{10}$) across the test varistor was measured by the voltmeter 20. The nonlinearity coefficient ($\alpha$) was computed from the voltages $V_1$ and $V_{10}$ and currents $I_1$ and $I_{10}$, by the formula:

$$\alpha = \frac{\log (I_{10}/I_1)}{\log (V_{10}/V_1)} = \frac{1}{\log (V_{10}/V_1)}$$

The temperature dependence ($\Delta V_1$) of the varistor voltage ($V_1$) was also ascertained by use of the FIG. 2 circuit. The temperature in the thermostatic vessel 22 was varied in the range from $-40°$ to $+125°$ C. At each temperature (T, °C.) a varistor voltage ($V_{1T}$) was measured when a current of one milliampere flowed from current source 16 to each test varistor 10 in the vessel 22. The temperature dependence ($\Delta V_1$) of the varistor voltage was determined by computing the variation of the varistor voltage ($V_{1T}$) at each temperature from the varistor voltage ($V_1$) at 20° C., in accordance with the equation:

$$\Delta V_1 = \frac{V_{1T} - V_1}{V_1} \times \frac{100}{T(°C.) - 20(°C.)} \quad (\%/°C.)$$

The tabulated figures represent only the maximum variations in the noted temperature range.

Figure 3:
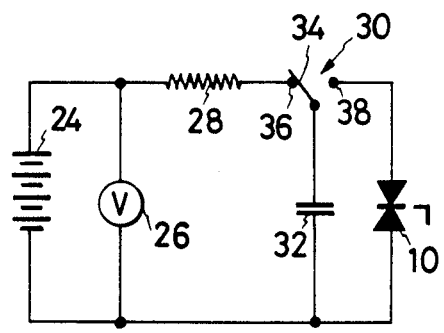
FIG. 3 is a similar diagram of a circuit for applying surges to the test varistors, in order to re-examine their properties after surge application.

FIG. 3 shows a circuit used for the application of high voltage pulses or surges to the test varistors, in order to examine the extents to which the above three properties of the test varistors are affected by the surges. The surge application circuit has a constant DC voltage source 24 of two kilovolts, connected in parallel with a voltmeter 26. The power source 24 is further connected via a five-ohm resistor 28 and single-pole double-throw switch 30 to a 2.5-microfarad capacitor 32, which in turn is connected in parallel with a test varistor 10 via the switch 30. This switch has a movable contact 34 connected to the capacitor 32, a first fixed contact 36 connected to the power source 24 via the resistor 28, and a second fixed contact 38 connected to the test varistor 10. The capacitor 32 is charged during engagement of the movable contact 34 with the first fixed contact 36 and is discharged upon engagement of the movable contact with the second fixed contact 38 for the application of a surge to the test varistor 10.

By use of the FIG. 3 circuit configured as above, a succession of five surges were applied to each test varistor 10 at three-second intervals. Each surge-applied test varistor 10 was again connected in the FIG. 2 circuit to re-examine its varistor voltage ($V_{1P}$) and nonlinearity coefficient ($\alpha_P$). The percent variation ($\Delta V_{1P}$) of the varistor voltage after the surge application was computed by $$\Delta V_{1P} = \frac{V_{1P} - V_1}{V_1} \times 100 \, (\%)$$

The percent variation ($\Delta \alpha_P$) of the nonlinearity coefficient after the surge application was computed by $$\Delta \alpha_P = \frac{\alpha_P - \alpha}{\alpha} \times 100 \, (\%)$$

The temperature dependence ($\Delta V_{1T}$) of the varistor voltage after the surge application by the FIG. 3 circuit was ascertained by the FIG. 2 circuit in the same manner as the temperature dependence ($\Delta V_1$) of the varistor voltage before surge application.

The capacitances (C) of the test varistors were measured at one kilohertz and tabulated in nanofarads (nF).

In Table 2 the figures represent the averages of ten specimens of each Example. The same holds true with all the subsequent tables setting forth the properties of additional test varistors.

TABLE 2

| Example | Varistor Properties | | | | | |
|---|---|---|---|---|---|---|
| | $V_1$, V | $\alpha$ | $\Delta V_1$, %/°C. | C, nF | $\Delta V_{1P}$, % | $\Delta\alpha_P$, % | $\Delta V_{1T}$, %/°C. |
| 1 | 18.3 | 25.4 | −0.02 | 146 | −0.4 | −0.5 | −0.02 |
| 2 | 18.0 | 27.2 | −0.02 | 152 | −0.3 | −0.3 | −0.02 |
| 3 | 16.4 | 28.1 | −0.01 | 160 | −0.3 | −0.4 | −0.01 |
| 4 | 19.0 | 27.5 | −0.01 | 141 | −0.5 | −0.5 | −0.01 |
| 5 | 19.3 | 26.9 | −0.03 | 128 | −0.4 | −0.5 | −0.03 |
| 6 | 19.9 | 21.1 | −0.04 | 147 | −0.4 | −0.6 | −0.04 |
| 7 | 21.4 | 25.4 | −0.03 | 100 | −0.8 | −0.9 | −0.03 |
| 8 | 24.1 | 27.0 | −0.03 | 121 | −0.6 | −0.7 | −0.03 |
| 9 | 24.7 | 27.9 | −0.02 | 110 | −0.6 | −0.7 | −0.02 |
| 10 | 23.7 | 26.1 | −0.01 | 108 | −0.8 | −0.8 | −0.01 |
| 11 | 22.6 | 25.0 | −0.03 | 92 | −1.0 | −1.0 | −0.03 |
| 12 | 20.0 | 17.8 | −0.05 | 104 | −0.9 | −1.0 | −0.05 |
| 13 | 13.7 | 22.8 | −0.02 | 126 | −0.9 | −1.0 | −0.02 |
| 14 | 16.4 | 24.4 | −0.02 | 127 | −0.6 | −0.5 | −0.02 |
| 15 | 14.2 | 23.9 | −0.02 | 134 | −0.6 | −0.6 | −0.02 |
| 16 | 17.0 | 24.2 | −0.02 | 112 | −0.7 | −0.8 | −0.02 |
| 17 | 16.4 | 22.1 | −0.03 | 90 | −0.9 | −1.0 | −0.03 |
| 18 | 13.2 | 19.4 | −0.04 | 119 | −1.0 | −1.0 | −0.05 |
| 19 | 31.1 | 24.6 | −0.01 | 92 | −0.8 | −1.0 | −0.01 |
| 20 | 34.6 | 30.8 | −0.01 | 144 | −0.3 | −0.4 | −0.01 |
| 21 | 37.9 | 33.5 | −0.01 | 120 | −0.4 | −0.5 | −0.01 |
| 22 | 35.1 | 26.7 | −0.01 | 114 | −0.6 | −0.7 | −0.01 |
| 23 | 30.2 | 23.1 | −0.02 | 117 | −0.7 | −0.7 | −0.02 |
| 24 | 36.6 | 22.6 | −0.02 | 96 | −0.7 | −0.5 | −0.02 |
| 25 | 39.1 | 7.0 | −0.30 | 64 | −12.7 | −16.0 | −0.36 |
| 26 | 45.3 | 22.0 | −0.03 | 70 | −0.9 | −0.9 | −0.03 |
| 27 | 43.0 | 24.4 | −0.02 | 78 | −0.6 | −0.7 | −0.02 |
| 28 | 42.7 | 26.7 | −0.02 | 94 | −0.5 | −0.7 | −0.02 |
| 29 | 47.6 | 26.0 | −0.02 | 86 | −0.8 | −0.8 | −0.02 |
| 30 | 41.6 | 24.8 | −0.03 | 83 | −1.0 | −0.9 | −0.03 |
| 31 | 42.3 | 8.1 | −0.20 | 66 | −23.1 | −30.3 | −0.32 |
| 32 | 42.8 | 8.1 | −0.15 | 71 | −5.2 | −6.7 | −0.21 |
| 33 | 12.5 | 20.0 | −0.03 | 107 | −1.0 | −1.0 | −0.03 |
| 34 | 11.5 | 25.8 | −0.03 | 106 | −0.8 | −0.5 | −0.03 |
| 35 | 12.9 | 28.0 | −0.02 | 132 | −0.6 | −0.8 | −0.03 |
| 36 | 35.5 | 12.6 | −0.10 | 65 | −5.4 | −6.6 | −0.15 |
| 37 | 32.2 | 24.1 | −0.02 | 83 | −0.7 | −0.1 | −0.02 |
| 38 | 37.0 | 21.1 | −0.03 | 70 | −0.9 | −1.0 | −0.03 |
| 39 | 25.9 | 20.0 | −0.03 | 114 | −0.9 | −0.8 | −0.03 |
| 40 | 23.1 | 22.4 | −0.02 | 112 | −0.9 | −0.9 | −0.02 |
| 41 | 27.0 | 22.7 | −0.01 | 100 | −0.9 | −0.6 | −0.01 |
| 42 | 53.8 | 21.6 | −0.03 | 80 | −0.8 | −0.7 | −0.03 |
| 43 | 50.4 | 33.0 | −0.01 | 99 | −0.4 | −0.6 | −0.01 |
| 44 | 50.1 | 27.3 | −0.01 | 97 | −0.6 | −0.6 | −0.01 |
| 45 | 8.2 | 17.4 | −0.03 | 154 | −0.9 | −0.8 | −0.03 |
| 46 | 9.1 | 19.1 | −0.01 | 188 | −0.4 | −0.6 | −0.01 |
| 47 | Not coherently bonded on firing. | | | | | | |
| 48 | 18.7 | 23.7 | −0.03 | 135 | −0.9 | −0.8 | −0.03 |
| 49 | 20.5 | 28.6 | −0.02 | 145 | −0.6 | −0.5 | −0.02 |
| 50 | 19.0 | 19.7 | −0.03 | 119 | −0.9 | −1.0 | −0.03 |
| 51 | 15.2 | 19.9 | −0.03 | 127 | −0.9 | −0.6 | −0.03 |
| 52 | 19.5 | 21.5 | −0.02 | 105 | −0.6 | −0.8 | −0.02 |
| 53 | 22.0 | 22.2 | −0.03 | 90 | −0.8 | −0.5 | −0.03 |
| 54 | 16.9 | 26.5 | −0.01 | 156 | −0.5 | −0.5 | −0.01 |
| 55 | 16.1 | 24.0 | −0.01 | 131 | −0.7 | −0.8 | −0.01 |
| 56 | 19.0 | 23.9 | −0.03 | 121 | −0.8 | −0.8 | −0.03 |
| 57 | 21.8 | 22.1 | −0.02 | 100 | −0.8 | −1.0 | −0.02 |
| 58 | 15.4 | 19.0 | −0.02 | 110 | −0.9 | −1.0 | −0.02 |
| 59 | 24.5 | 23.8 | −0.03 | 94 | −1.0 | −0.9 | −0.03 |
| 60 | 29.7 | 20.4 | −0.03 | 87 | −1.0 | −1.0 | −0.03 |
| 61 | 22.6 | 21.9 | −0.03 | 110 | −0.7 | −0.7 | −0.03 |
| 62 | 31.1 | 24.2 | −0.03 | 98 | −0.6 | −0.8 | −0.03 |
| 63 | 34.6 | 21.1 | −0.03 | 80 | 0.0 | −1.0 | −0.03 |
| 64 | 37.9 | 25.4 | −0.02 | 116 | −0.8 | −0.8 | −0.02 |

Attention is called to the compositions of Examples other than 6, 12, 18, 25, 31, 32, 36 and 47 in Table 1. All these inventive Examples contain 100 parts of $SrTiO_3$, from 0.01 to 3.00 parts of one or more of the listed metal oxides, from 0.02 to 2.50 parts of $Na_2O$, and from 0.01 to 1.50 parts of $Al_2O_3$. Let us now study from Table 2 the properties of the test varistors formulated from the above ceramic compositions of the inventive Examples.

The percent variations ($\Delta V_{1P}$) of the varistor voltages ($V_1$) after surge application are less than 1.0 in absolute values in all the test varistors of the inventive Examples. The percent variations ($\Delta\alpha_P$) of the nonlinearity coefficients ($\alpha$) after surge application are also less than 1.0. The temperature dependences ($\Delta V_{1T}$) of the varistor voltages ($V_1$) after surge application fall in the range from 0.01 to 0.03%/°C. in absolute values. These values are better than those exhibited by ceramic varistors of like compositions except for the absence of $Al_2O_3$. The nonlinearity coefficients ($\alpha$) range from about 17 to about 34, which values are also better than those of ceramic varistors of similar compositions except for the absence of $Al_2O_3$. The varistor voltages ($V_1$) range from 8.2 to 53.8 volts. These values make the varistors suitable for use in electronic circuits with voltage ratings of approximately five through 36 volts. The temperature dependences ($\Delta V_1$) of the varistor voltages ($V_1$) before surge application fall in the range from 0.01 to 0.03%/°C. in absolute values, which are also better than those of ceramic varistors of analogous compositions except for the absence of $Al_2O_3$. The capacitances (C) are not less than 70 nF (apparent relative dielectric constants not less than $1.26 \times 10^5$).

A consideration of Examples 1 through 18, with reference had to both Tables 1 and 2, will make clear the preferable range of proportions of $Al_2O_3$, the fourth ingredient of our ceramic compositions. Those test varistors containing from 0.01 to 1.50 parts of $Al_2O_3$ were improved in nonlinearity coefficient ($\alpha$) and in the temperature dependences ($\Delta V_1$ and $\Delta V_{1T}$) of varistor voltage ($V_1$) before and after surge application. No improvement in these properties took place when the proportion of $Al_2O_3$ fell short of 0.01 part. When the $Al_2O_3$ proportion exceeded 1.50 parts, on the other hand, the moldings of the pasted material were not coherently bonded into desired ceramic test discs on firing. Accordingly we set the proportion of $Al_2O_3$ in the range from about 0.01 to about 1.50 parts.

As regards the preferred proportions of the metal oxide or oxides used as the second ingredient or group of ingredients, reference is directed to Examples 25, 47 and 36. Example 25 contains 3.50 parts of $WO_3$ and Example 47 contains 3.50 parts of $Y_2O_3$, as the second ingredient. The properties of the test varistors are very poor in Example 25, and the moldings of the pasted material were not coherently bonded on firing in Example 47. Example 36 contains only 0.005 part of $Nd_2O_3$ as the second ingredient. The ceramic material of this Example was not sufficiently semiconductive, and the properties of the test varistors fabricated therefrom are of course unsatisfactory. Thus, in order to render the ceramic materials sufficiently semiconductive, the proportion of the metal oxide or oxides should be in the range from about 0.01 to about 3.00 parts.

A study of Examples 31 and 32 will reveal the preferred range of proportions of $Na_2O$ or $NaF$ to be used as the third ingredient. Example 31 contains 0.01 part of $Na_2O$, and Example 32 contains 3.00 parts of $Na_2O$, both before and after firing. In the test varistors formulated from these ceramic compositions, the percent variations ($\Delta V_{1P}$ and $\Delta\alpha_P$) of varistor voltages and nonlinearity coefficients after surge application are much more than one in absolute values, and the temperature dependences ($\Delta V_{1T}$) of varistor voltages after surge application are also far more than 0.03 in absolute values. The proportions of $Na_2O$ in the completed ceramic materials should therefore be in the range from 0.02 to 2.50 parts.

From the above discussed results of Tables 1 and 2, Examples 6, 12, 18, 25, 31, 32, 36 and 47 fall outside the purview of our invention.

It will be observed from Table 1 that Examples 51 through 64 contain two or three different substances, at least initially, as the second and/or third group of ingredients. As is evident from Table 2, the properties of the resulting test varistors were as favorable as those of the test varistors of the other inventive Examples.

EXAMPLES 65–106

$SrTiO_3$, the first ingredient, was prepared by the same method as in Examples 1 through 64. To 100 parts of $SrTiO_3$ in finely divided form there were added:

1. One or more of $Nb_2O_5$, $Ta_2O_5$, $WO_3$, $La_2O_3$, $CeO_2$, $Nd_2O_3$, $Pr_6O_{11}$, $Y_2O_3$, $Sm_2O_3$, $Eu_2O_3$, and $Dy_2O_3$ (second group of ingredients) in finely divided form.
2. Either or both of $Na_2O$ and NaF (third group of ingredients) in finely divided form.
3. $Al_2O_3$ (fourth ingredient) in finely divided form.
4. One or more of $Ag_2O$, CuO, $MnO_2$, and $SiO_2$ (fifth group of ingredients) in finely divided form.

We prepared forty-two combinations of the above ingredients in different sets of proportions set forth in Table 3. These combinations of the ingredients were processed into test varistors by the same method as in Examples 1 through 64. Then the seven properties in question of the test varistors were measured by the same method and the same means as in Examples 1 through 64. Table 4 represents the results.

TABLE 3

Ceramic Compositions
(Aside from 100 parts of $SrTiO_3$, the first ingredient)

| Example | Second ingredient(s) in use and proportion(s), part | Starting third ingredient(s) in use and proportion(s), part | Fourth ingredient, $Al_2O_3$, part | Fifth ingredient(s) in use and proportion(s), part | Postfiring third ingredient, $Na_2O$, part |
|---|---|---|---|---|---|
| 65 | $Nb_2O_5$, 0.10 | $Na_2O$, 1.00 | 0.10 | $MnO_2$, 0.01 | 1.00 |
| 66 | $La_2O_3$, 1.00 | NaF, 0.04 | 1.00 | $Ag_2O$, 0.01 | 0.02 |
| 67 | $Dy_2O_3$, 3.00 | $Na_2O$, 0.02 | 0.01 | CuO, 0.01 | 0.02 |
| 68 | $Ta_2O_5$, 1.00 | NaF, 5.00 | 1.00 | $SiO_2$, 0.01 | 2.50 |
| 69 | $Pr_6O_{11}$, 3.00 | NaF, 3.00 | 0.50 | $MnO_2$, 0.10 | 1.50 |
| 70 | $Nd_2O_3$, 0.50 | NaF, 0.20 | 1.50 | $Ag_2O$, 0.10 | 0.10 |
| 71 | $Y_2O_3$, 0.10 | NaF, 5.00 | 1.50 | CuO, 0.10 | 2.50 |
| 72 | $Sm_2O_3$, 1.00 | $Na_2O$, 2.00 | 1.00 | $SiO_2$, 0.10 | 2.00 |
| 73 | $WO_3$, 0.01 | $Na_2O$, 0.50 | 0.50 | $MnO_2$, 0.50 | 0.50 |
| 74 | $Y_2O_3$, 1.00 | $Na_2O$, 1.00 | 0.10 | $Ag_2O$, 0.50 | 1.00 |
| 75 | $La_2O_3$, 0.50 | NaF, 2.00 | 1.00 | CuO, 0.50 | 1.00 |
| 76 | $Pr_6O_{11}$, 0.01 | NaF, 0.04 | 1.50 | $SiO_2$, 0.50 | 0.02 |
| 77 | $Nd_2O_3$, 1.00 | NaF, 5.00 | 0.01 | $MnO_2$, 1.00 | 2.50 |
| 78 | $CeO_2$, 2.00 | $Na_2O$, 0.10 | 1.00 | $Ag_2O$, 1.00 | 0.10 |
| 79 | $Nb_2O_5$, 0.50 | NaF, 0.20 | 0.10 | CuO, 1.00 | 0.10 |
| 80 | $Ta_2O_5$, 3.00 | NaF, 1.00 | 0.50 | $SiO_2$, 1.00 | 0.50 |
| 81 | $Sm_2O_3$, 0.50 | NaF, 2.00 | 1.00 | $MnO_2$, 3.00 | 1.00 |
| 82 | $Eu_2O_3$, 0.01 | $Na_2O$, 0.02 | 0.10 | $Ag_2O$, 3.00 | 0.02 |
| 83 | $Nd_2O_3$, 2.00 | $Na_2O$, 0.10 | 0.01 | CuO, 3.00 | 0.10 |
| 84 | $La_2O_3$, 0.01 | $Na_2O$, 0.50 | 1.50 | $SiO_2$, 3.00 | 0.50 |
| 85 | $Ta_2O_5$, 0.10 | NaF, 5.00 | 1.00 | $MnO_2$, 3.50 | 2.50 |
| 86 | $Nb_2O_5$, 3.00 | NaF, 2.00 | 0.50 | $Ag_2O$, 3.50 | 1.00 |
| 87 | $Dy_2O_3$, 0.10 | NaF, 1.00 | 0.10 | CuO, 3.50 | 0.50 |
| 88 | $WO_3$, 0.50 | NaF, 0.04 | 0.01 | $SiO_2$, 3.50 | 0.02 |
| 89 | $Nb_2O_5$, 0.005 | NaF, 1.00 | 0.50 | $MnO_2$, 0.01 | 0.50 |
| 90 | $La_2O_3$, 3.50 | $Na_2O$, 2.00 | 1.00 | $SiO_2$, 0.10 | 2.00 |
| 91 | $WO_3$, 3.50 | $Na_2O$, 1.00 | 0.10 | CuO, 1.00 | 1.00 |
| 92 | $Nd_2O_3$, 0.10 | $Na_2O$ 0.01 | 1.00 | $Ag_2O$, 0.50 | 0.01 |
| 93 | $CeO_2$, 1.00 | NaF, 6.00 | 1.00 | $MnO_2$, 1.00 | 3.00 |
| 94 | $Y_2O_3$, 0.10 | NaF, 5.00 | — | CuO, 0.10 | 2.50 |
| 95 | $Sm_2O_3$, 0.50 | NaF, 2.00 | 2.00 | $MnO_2$, 3.00 | 1.00 |
| 96 | $Nb_2O_5$, 0.10 | $Na_2O$, 0.02 | 0.01 | $MnO_2$, 0.20 $Ag_2O$, 0.30 | 0.02 |
| 97 | $Dy_2O_3$, 1.00 | $Na_2O$, 0.50 | 0.01 | $Ag_2O$, 1.00 $SiO_2$, 2.00 | 0.50 |
| 98 | $WO_3$, 3.00 | $Na_2O$, 0.02 | 1.50 | CuO, 0.10 $MnO_2$, 1.00 | 0.02 |
| 99 | $La_2O_3$, 0.10 $Y_2O_3$, 0.50 | $Na_2O$, 0.50 | 0.10 | CuO, 2.00 $SiO_2$, 1.00 | 0.50 |
| 100 | $CeO_2$, 0.01 | $Na_2O$, 0.10 | 0.10 | $MnO_2$, 0.50 $Ag_2O$, 1.00 | 0.10 |
| 101 | $WO_3$, 1.00 $Dy_2O_3$, 1.00 | $Na_2O$, 2.50 | 0.50 | $Ag_2O$, 0.005 $SiO_2$, 0.005 | 2.50 |
| 102 | $Pr_6O_{11}$, 0.50 | $Na_2O$, 0.10 | 0.50 | CuO, 1.00 $MnO_2$, 2.00 | 0.10 |
| 103 | $Eu_2O_3$, 0.005 $Nb_2O_5$, 0.005 | $Na_2O$, 2.50 | 1.00 | CuO, 0.1 $SiO_2$, 1.0 | 2.50 |
| 104 | $Ta_2O_5$, 2.00 $WO_3$, 1.00 | $Na_2O$, 1.00 | 1.00 | CuO, 0.5 $Ag_2O$, 2.0 | 1.00 |
| 105 | $La_2O_3$, 0.10 | $Na_2O$, 0.10 | 1.50 | CuO, 1.0 $SiO_2$, 0.5 $MnO_2$, 0.1 | 0.10 |
| 106 | $Nb_2O_5$, 0.50 $La_2O_3$, 1.00 | $Na_2O$, 2.00 | 1.50 | CuO, 2.0 $Ag_2O$, 0.5 | 2.00 |

TABLE 3-continued

Ceramic Compositions
(Aside from 100 parts of SrTiO₃, the first ingredient)

| Example | Second ingredient(s) in use and proportion(s), part | Starting third ingredient(s) in use and proportion(s), part | Fourth ingredient, Al₂O₃, part | Fifth ingredient(s) in use and proportion(s), part | Postfiring third ingredient, Na₂O, part |
|---|---|---|---|---|---|
| | WO₃, 1.00 | | | SiO₂, 0.1 | |

TABLE 4

Varistor Properties

| Example | $V_1$, V | $\alpha$ | $\Delta V_1$, %/°C | C, nF | $\Delta V_{1P}$, % | $\Delta\alpha_P$, % | $\Delta V_{1T}$, %/°C |
|---|---|---|---|---|---|---|---|
| 65 | 19.0 | 30.1 | −0.02 | 161 | −0.4 | −0.5 | −0.02 |
| 66 | 23.4 | 30.7 | −0.01 | 115 | −0.8 | −0.9 | −0.01 |
| 67 | 18.7 | 23.7 | −0.02 | 122 | −0.9 | −1.0 | −0.02 |
| 68 | 12.0 | 29.6 | −0.03 | 100 | −0.7 | −0.9 | −0.03 |
| 69 | 15.8 | 36.4 | −0.02 | 157 | −0.7 | −0.6 | −0.02 |
| 70 | 32.9 | 38.2 | −0.02 | 89 | −0.8 | −0.7 | −0.02 |
| 71 | 9.1 | 23.9 | −0.03 | 176 | −1.0 | −1.0 | −0.03 |
| 72 | 52.3 | 34.3 | −0.01 | 85 | −0.5 | −0.6 | −0.01 |
| 73 | 32.4 | 33.3 | −0.01 | 127 | −1.0 | −1.0 | −0.01 |
| 74 | 20.2 | 38.2 | −0.01 | 132 | −0.8 | −0.8 | −0.01 |
| 75 | 27.2 | 40.5 | −0.02 | 130 | −0.8 | −0.9 | −0.02 |
| 76 | 26.3 | 30.0 | −0.03 | 104 | −0.7 | −0.8 | −0.03 |
| 77 | 26.7 | 29.9 | −0.03 | 100 | −1.0 | −0.6 | −0.03 |
| 78 | 38.9 | 34.1 | −0.02 | 94 | −1.0 | −0.9 | −0.02 |
| 79 | 34.2 | 33.0 | −0.01 | 133 | −1.0 | −1.0 | −0.01 |
| 80 | 32.8 | 30.8 | −0.02 | 97 | −0.8 | −0.8 | −0.02 |
| 81 | 35.2 | 27.4 | −0.01 | 126 | −1.0 | −0.7 | −0.01 |
| 82 | 19.5 | 25.9 | −0.02 | 106 | −0.9 | −1.0 | −0.02 |
| 83 | 29.3 | 25.2 | −0.02 | 118 | −1.0 | −0.9 | −0.02 |
| 84 | 15.4 | 27.1 | −0.03 | 80 | −0.9 | −0.9 | −0.03 |
| 85 | 34.8 | 28.7 | −0.03 | 102 | −25.0 | −33.2 | −0.03 |
| 86 | 31.6 | 31.0 | −0.02 | 125 | −16.6 | −15.4 | −0.02 |
| 87 | 29.0 | 27.8 | −0.02 | 125 | −18.1 | −20.1 | −0.02 |
| 88 | Not coherently bonded on firing. | | | | | | |
| 89 | 24.6 | 11.8 | −0.22 | 89 | −10.4 | −15.6 | −0.27 |
| 90 | Not coherently bonded on firing. | | | | | | |
| 91 | 37.9 | 9.4 | −0.33 | 69 | −15.2 | −19.1 | −0.34 |
| 92 | 24.5 | 17.0 | −0.20 | 90 | −30.7 | −35.2 | −0.27 |
| 93 | 38.0 | 13.0 | −0.15 | 81 | −11.8 | −13.8 | −0.24 |
| 94 | 11.6 | 21.1 | −0.05 | 165 | −0.9 | −1.0 | −0.05 |
| 95 | Not coherently bonded on firing. | | | | | | |
| 96 | 46.4 | 29.4 | −0.03 | 92 | −0.9 | −1.0 | −0.03 |
| 97 | 40.7 | 32.2 | −0.03 | 71 | −0.6 | −0.5 | −0.03 |
| 98 | 43.2 | 35.2 | −0.03 | 76 | −1.0 | −1.0 | −0.03 |
| 99 | 14.6 | 26.4 | −0.01 | 150 | −0.7 | −0.6 | −0.01 |
| 100 | 11.2 | 22.2 | −0.02 | 194 | −0.8 | −0.9 | −0.02 |
| 101 | 17.8 | 23.0 | −0.03 | 112 | −0.9 | −0.7 | −0.03 |
| 102 | 13.7 | 27.2 | −0.01 | 174 | −0.9 | −1.0 | −0.01 |
| 103 | 26.4 | 28.5 | −0.03 | 105 | −1.0 | −1.0 | −0.03 |
| 104 | 27.6 | 30.9 | −0.02 | 114 | −0.9 | −1.0 | −0.02 |
| 105 | 24.6 | 32.3 | −0.02 | 113 | −0.7 | −0.9 | −0.02 |
| 106 | 22.7 | 26.6 | −0.03 | 124 | −0.8 | −0.8 | −0.03 |

Let us consider the ceramic compositions of Examples 65 through 84 and 96 through 106 in Table 3. All these Examples contain from 0.01 to 3.00 parts of one or more of Ag₂O, CuO, MnO₂ and SiO₂ as the fifth ingredient or set of ingredients. As is seen from Table 4, the test varistors of these inventive compositions suffer little from surges and also are excellent in nonlinearity coefficient and the temperature dependence of the varistor voltage.

More specifically the varistor voltages ($V_1$) of the inventive test varistors are in the range from nine to 53 volts. The nonlinearity coefficients ($\alpha$) are in the range from 23 to 41. The percent variations ($\Delta V_{1P}$) of the varistor voltages after surge application are not more than 1.0 in absolute values. The percent variations ($\Delta\alpha_P$) of the nonlinearity coefficients after surge application are also not more than 1.0 in absolute values. The temperature dependences ($\Delta V_{1T}$) of the varistor voltages after surge application are not more than 0.03 in absolute values. The capacitances (C) are not less than 80 nF (apparent relative dielectric constants not less than $1.44 \times 10^5$).

As has been mentioned, the addition of the fifth ingredient or set of ingredients serves to improve the nonlinearity coefficient of the resulting varistors. This will become apparent upon comparison of Examples 2 and 65; 10 and 66; 15 and 69; 19 and 73; 34 and 68; 37 and 70; 44 and 72; 45 and 71; and 50 and 67.

Further the paste moldings of the inventive Examples highly coherently bonded into ceramic bodies on firing.

In Examples 85 through 88 the proportion of each oxide used as the fifth ingredient is set at 3.50. The test varistors of these compositions were very vulnerable to surges. The absolute values of their $\Delta V_{1P}$ and $\Delta\alpha_P$ are mostly greater than 15. When the proportion of the fifth ingredient or set of ingredients fell short of 0.01, part on the other hand, then the nonlinearity coefficients of the resulting varistors did not improve. We conclude from the foregoing results that the proportion of the fifth ingredient or group of ingredients should be from about 0.01 to about 3.00 parts.

Even when combined with the fifth ingredient or set of ingredients, the first to fourth ingredients or sets of ingredients function as set forth in connection with Examples 1 through 64. Examples 65 through 106 prove, therefore, that the ceramic compositions comprising 100 parts of the first ingredient, from about 0.01 to about 3.00 parts of the second ingredient or set of ingredients, from about 0.02 to about 2.50 parts of the third ingredient, from about 0.01 to about 1.50 parts of the fourth ingredients, and from about 0.01 to about 3.00 parts of the fifth ingredient or set of ingredients in accordance with our invention make possible the provision of varistors whose varistor voltages are hardly affected by temperatures, which suffer little from surges, and which have high nonlinearity coefficients.

From the foregoing results derived from Tables 3 and 4, it will be understood that Examples 85 through 95 fall outside the purview of our invention.

Examples 96 through 106 contain two or more different substances as the fifth set of ingredients, and one or more substances as the second ingredient or set of ingredients. The properties of the resulting varistors were just as favorable as those of the test varistors of the other inventive Examples.

EXAMPLES 107-121

It will be recalled that the ceramic test discs used in Examples 1 through 106 were subjected to oxidative heat treatment in the temperature range from 1000° to 1200° C. for three hours in the final step of their preparation, as has been set forth in conjunction with Examples 1 through 64. In order to ascertain the relationship between the temperature of the oxidative heat treatment and the properties of the resulting varistors, we prepared ceramic test discs by the same method as in Examples 1 through 106 except that the oxidative heat treatment was conducted on different groups of test discs at five different temperatures of 900°, 1000°, 1100°, 1200° and 1300° C. The period of the treatment was two hours at each temperature. The ceramic compositions tested were the same as in Examples 65, 75 and 80.

We processed the above treated test discs into varistors by the same method as in Examples 1 through 106 and measured their properties by the same methods and the same means as in Examples 1 through 106. Table 5 gives the results. In this Table the symbol $T_H$ denotes the temperature of the oxidative heat treatment.

TABLE 5

| | | | Ceramic Compositions and Varistor Properties | | | | | | |
|---|---|---|---|---|---|---|---|---|---|
| Example | Composition | $T_H$, °C. | $V_1$, V | $\alpha$ | $\Delta V_1$, %/°C. | C, nF | $\Delta V_{1P}$, % | $\Delta \alpha_P$, % | $\Delta V_{1T}$, %/°C. |
| | Same as: | | | | | | | | |
| 107 | Example 65 | 900 | 8.1 | 21.7 | −0.03 | 169 | −0.8 | −0.6 | −0.03 |
| 108 | Example 65 | 1000 | 25.3 | 31.6 | −0.02 | 125 | −0.4 | −0.6 | −0.02 |
| 109 | Example 65 | 1100 | 64.4 | 35.7 | −0.01 | 94 | −0.4 | −0.5 | −0.01 |
| 110 | Example 65 | 1200 | 160.1 | 38.4 | −0.01 | 69 | −0.3 | −0.6 | −0.01 |
| 111 | Example 65 | 1300 | 247.8 | 39.2 | −0.01 | 60 | −0.3 | −0.5 | −0.01 |
| 112 | Example 75 | 900 | 15.0 | 30.6 | −0.02 | 210 | −0.9 | −1.0 | −0.02 |
| 113 | Example 75 | 1000 | 64.8 | 46.8 | −0.01 | 106 | −0.6 | −0.9 | −0.01 |
| 114 | Example 75 | 1100 | 123.3 | 47.4 | −0.01 | 81 | −0.6 | −0.8 | −0.01 |
| 115 | Example 75 | 1200 | 230.2 | 47.2 | −0.01 | 65 | −0.5 | −0.6 | −0.01 |
| 116 | Example 75 | 1300 | 357.2 | 47.5 | −0.01 | 56 | −0.5 | −0.6 | −0.01 |
| 117 | Example 80 | 900 | 5.5 | 19.0 | −0.03 | 162 | −1.0 | −1.0 | −0.03 |
| 118 | Example 80 | 1000 | 11.9 | 24.9 | −0.03 | 136 | −1.0 | −1.0 | −0.03 |
| 119 | Example 80 | 1100 | 25.5 | 29.9 | −0.02 | 128 | −0.9 | −0.9 | −0.02 |
| 120 | Example 80 | 1200 | 82.6 | 35.1 | −0.02 | 81 | −0.7 | −0.5 | −0.02 |
| 121 | Example 80 | 1300 | 140.6 | 40.0 | −0.01 | 71 | −0.7 | −0.5 | −0.01 |

As indicated in Table 5, the varistor voltages ($V_1$) of each group of test varistors became progressively greater with the higher temperatures of the oxidative heat treatment even though the varistors were of the same size and composition. The other properties of the test varistors also differed significantly in each group. Thus our invention makes possible the provision of varistors of the same size and composition but of different properties merely by changing the temperature of the oxidative heat treatment on the ceramic bodies. This results in substantial savings in the manufacturing costs of varistors. A preferred temperature range of the oxidative heat treatment for the provision of surge-proof varistors is from 900° to 1300° C.

EXAMPLE 122

In this Example we sought to ascertain if the third ingredient, $Na_2O$, could be added to ceramic bodies after their firing, rather than being used as one of the starting substances, for the provision of varistors meeting the requirements of our invention.

We fabricated semiconductive ceramic test discs from 100 parts of $SrTiO_3$ (first ingredient), 0.50 part of $Nb_2O_5$ (second ingredient), and 0.10 part of $Al_2O_3$ (fourth ingredient) by following the procedure of Examples 1 through 64 up to the firing of the discs. Then, instead of the thermal oxidation of the discs, pasted NaF was coated on one of the opposite faces of each disc at a rate of 1 mg/cm². The coated discs were heated to and held in the temperature range from 1000° to 1200° C. for two hours, in air. This heat treatment caused diffusion of $Na_2O$, converted from the NaF paste, into the discs. The thus prepared ceramic test discs were electroded into test varistors by the same method as in Examples 1 through 64.

Measured by the same means and the same methods as in Examples 1 through 64, the varistor voltages ($V_1$) of the test varistors averaged 32.5 volts; their nonlinearity coefficients ($\alpha$) 25.2; the temperature dependences ($\Delta V_1$) of their varistor voltages −0.01%/°C.; their capacitances (C) 106 nF; the percent variations ($\Delta V_{1P}$) of their varistor voltages after surge application −0.5; the percent variations ($\Delta \alpha_P$) of their nonlinearity coefficients after surge application −0.6; and the temperature dependences ($\Delta V_{1T}$) of their varistor voltages after surge application −0.01%/°C.

EXAMPLE 123

For the same purpose as in Example 122 we fabricated ceramic test discs from 100 parts of $SrTiO_3$ (first ingredient), 0.10 part of $La_2O_3$ (second ingredient), 0.01 part of $Al_2O_3$ (fourth ingredient), and 0.50 part of $SiO_2$ (fifth ingredient) by following the procedure of Examples 1 through 64 up to the firing of the discs. Then, instead of the oxidative heat treatment, pasted $Na_2O$ was coated on one of the opposite faces of each test disc at a rate of 1.5 mg/cm². The coated discs were heated as in Example 122 to cause diffusion of $Na_2O$ into the discs. Then the test discs were electroded into test varistors by the same method as in Examples 1 through 64.

Measured by the same means and the same methods as in Examples 1 through 64, the varistor voltages ($V_1$) of these test varistors averaged 19.1 volts; their nonlinearity coefficients ($\alpha$) 32.1; the temperature dependences ($\Delta V_1$) of their varistor voltages −0.03%/°C.; their capacitances (C) 149 nF; the percent variations ($\Delta V_{1P}$) of their varistor voltages after surge application −0 7; the percent variations ($\Delta \alpha_P$) of their nonlinearity coefficients after surge application −0.5; and the temperature dependences ($\Delta V_{1T}$) of their varistor voltages after surge application −0.03%/°C.

Examples 122 and 123 prove that $Na_2O$ or other sodium compound need not be one of the starting substances of the ceramic materials in accordance with our invention. The subsequent introduction of $Na_2O$ by thermal diffusion makes possible the provision of varistors that are as surge-proof as those fabricated with use of the sodium compound or compounds as a starting substance or substances.

The above and additional experiments conducted by us have revealed the following findings:

1. In firing moldings of the inventive ceramic compositions in a reductive atmosphere for the fabrication of ceramic bodies, the temperature can be in the range from 1300° to 1500° C., preferably from 1350° to 1450°

C. The period of such firing can be from two to eight hours.

2. The subsequent oxidative heat treatment of the fired moldings can be effected in the temperature range from 850° to 1350° C., for one to five hours.

3. Our invention requires that at least one of the listed metal oxides be contained in completed ceramic materials as the second ingredient. Thus the initial mixtures to be processed into ceramid bodies may contain, instead of the metal oxides themselves, other substances such as metallic elements, carbonates, hydroxides, nitrates, or oxalates that will become the desired metal oxides on firing.

4. The amount of polyvinyl alcohol or like organic binder, for use in pasting the mixtures of powdered ingredients in the production of the inventive ceramic materials, can be from five to 20, preferably from 10 to 15, percent by weight of the mixtures of the first to fourth, or first to fifth, ingredients.

5. While the intermingling of $SrCO_3$ and $TiO_2$ in a ratio of one to one is common for the prepartion of $SrTiO_3$, the final ratio of SrO to $TiO_2$ may fluctuate in the range from 0.97 to 1.03 for the provision of varistors that are approximately equivalent in electrical properties to those containing the first ingredient in the exact form of $SrTiO_3$.

Having thus fully disclosed our invention in terms of specific Examples thereof, we understand that they are meant purely to illustrate or explain and not to impose limitations upon the invention. Various modifications and alterations of our invention will occur to the ceramics specialists on the basis of this disclosure, without departing from the spirit or scope of the following claims.

What we claim is:

1. A semiconductive ceramic material with a voltage-dependent nonlinear resistance, comprising:
    (a) 100 mole parts of $SrTiO_3$;
    (b) from about 0.01 to about 3.00 mole parts of at least one metal oxide selected from the group consisting of $Nb_2O_5$, $Ta_2O_5$, $WO_3$, $La_2O_3$, $CeO_2$, $Nd_2O_3$, $Y_2O_3$, $Pr_6O_{11}$, $Sm_2O_3$, $Eu_2O_3$, and $Dy_2O_3$;
    (c) from about 0.02 to about 2.50 mole parts of $Na_2O$; and
    (d) from about 0.01 to about 1.50 mole parts of $Al_2O_3$.

2. A semiconductive ceramic material according to claim 1, further comprising from about 0.01 to about 3.00 mole parts of at least one oxide selected from the group consisting of $Ag_2O$, CuO, $MnO_2$, and $SiO_2$.

* * * * *